US009002631B2

(12) United States Patent
Taguchi

(10) Patent No.: US 9,002,631 B2
(45) Date of Patent: Apr. 7, 2015

(54) VICINITY ENVIRONMENT ESTIMATION DEVICE WITH BLIND REGION PREDICTION, ROAD DETECTION AND INTERVEHICLE COMMUNICATION

(75) Inventor: Koji Taguchi, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 790 days.

(21) Appl. No.: 12/309,882

(22) PCT Filed: Mar. 7, 2008

(86) PCT No.: PCT/IB2008/000974
§ 371 (c)(1),
(2), (4) Date: Feb. 2, 2009

(87) PCT Pub. No.: WO2008/107800
PCT Pub. Date: Sep. 12, 2008

(65) Prior Publication Data
US 2009/0326819 A1    Dec. 31, 2009

(30) Foreign Application Priority Data

Mar. 8, 2007    (JP) ................................. 2007-059161

(51) Int. Cl.
*B60Q 1/00*    (2006.01)
*B60R 22/00*    (2006.01)
(Continued)

(52) U.S. Cl.
CPC ................ *G01S 13/87* (2013.01); *B60W 40/04* (2013.01); *B60W 2050/0078* (2013.01);
(Continued)

(58) Field of Classification Search
CPC ...... G01S 13/93; G01G 19/03; G01G 19/387; G08G 7/00; G08G 1/16; G01C 21/00; G01C 23/00

USPC ........... 701/301, 45, 117, 300, 431, 523; 340/436, 438, 933, 901, 902, 988
See application file for complete search history.

(56) References Cited

U.S. PATENT DOCUMENTS

| | | | | |
|---|---|---|---|---|
| 6,615,137 | B2 * | 9/2003 | Lutter et al. | 701/301 |
| 7,061,373 | B2 * | 6/2006 | Takahashi | 340/435 |

(Continued)

FOREIGN PATENT DOCUMENTS

| | | |
|---|---|---|
| EP | 0 464 821 A1 | 1/1992 |
| JP | A-2005-32063 | 2/2005 |

(Continued)

OTHER PUBLICATIONS

Chinese Office Action issued on Mar. 29, 2012 in Chinese Patent Application No. 200880000676.3 (with Translation).

*Primary Examiner* — Adam Tissot
(74) *Attorney, Agent, or Firm* — Oliff PLC

(57) ABSTRACT

A vicinity environment estimation device includes neighborhood monitoring sensors that detect another vehicle, a car navigation system that acquires information about an untravelable region where a vehicle cannot travel, a vehicle-to-vehicle communication instrument that acquires information about detectable regions and results of detection of neighborhood monitoring sensors mounted in the another vehicle by wireless communication, and an ECU that estimates presence of a vehicle in the neighborhood of a host vehicle. When a blind closed region surrounded by detectable regions of the neighborhood monitoring sensors mounted in the another vehicle received by the host vehicle, detectable regions of the neighborhood monitoring sensors mounted in the host vehicle, and the untravelable region is formed, the ECU estimates the number of vehicles in the blind closed region which is not directly detectable by the neighborhood monitoring sensors, by continuously managing the entry/exist of vehicles to/from the blind closed region.

11 Claims, 9 Drawing Sheets

(51) Int. Cl.
  *G06K 9/00*   (2006.01)
  *G08G 1/017*  (2006.01)
  *G01S 13/87*  (2006.01)
  *B60W 40/04*  (2006.01)
  *G01S 13/93*  (2006.01)
  *G08G 1/16*   (2006.01)
  *B60W 50/00*  (2006.01)

(52) U.S. Cl.
  CPC ..... *B60W 2050/008* (2013.01); *B60W 2420/52* (2013.01); *B60W 2550/20* (2013.01); *B60W 2550/306* (2013.01); *B60W 2550/308* (2013.01); *G01S 13/931* (2013.01); *G01S 2013/9332* (2013.01); *G01S 2013/936* (2013.01); *G08G 1/163* (2013.01); *G01S 2013/9353* (2013.01); *G01S 2013/9375* (2013.01); *G01S 2013/9378* (2013.01); *G01S 2013/9385* (2013.01)

(56) References Cited

U.S. PATENT DOCUMENTS

| | | | |
|---|---|---|---|
| 7,379,813 B2 * | 5/2008 | Kubota et al. | 701/211 |
| 7,504,986 B2 * | 3/2009 | Brandt et al. | 342/70 |
| 2005/0012604 A1 | 1/2005 | Takahashi | |

FOREIGN PATENT DOCUMENTS

| | | |
|---|---|---|
| JP | A-2005-115637 | 4/2005 |
| JP | A-2006-315482 | 11/2006 |
| JP | A-2007-42039 | 2/2007 |
| WO | WO 2005/103757 A1 | 11/2005 |

* cited by examiner

F I G . 1
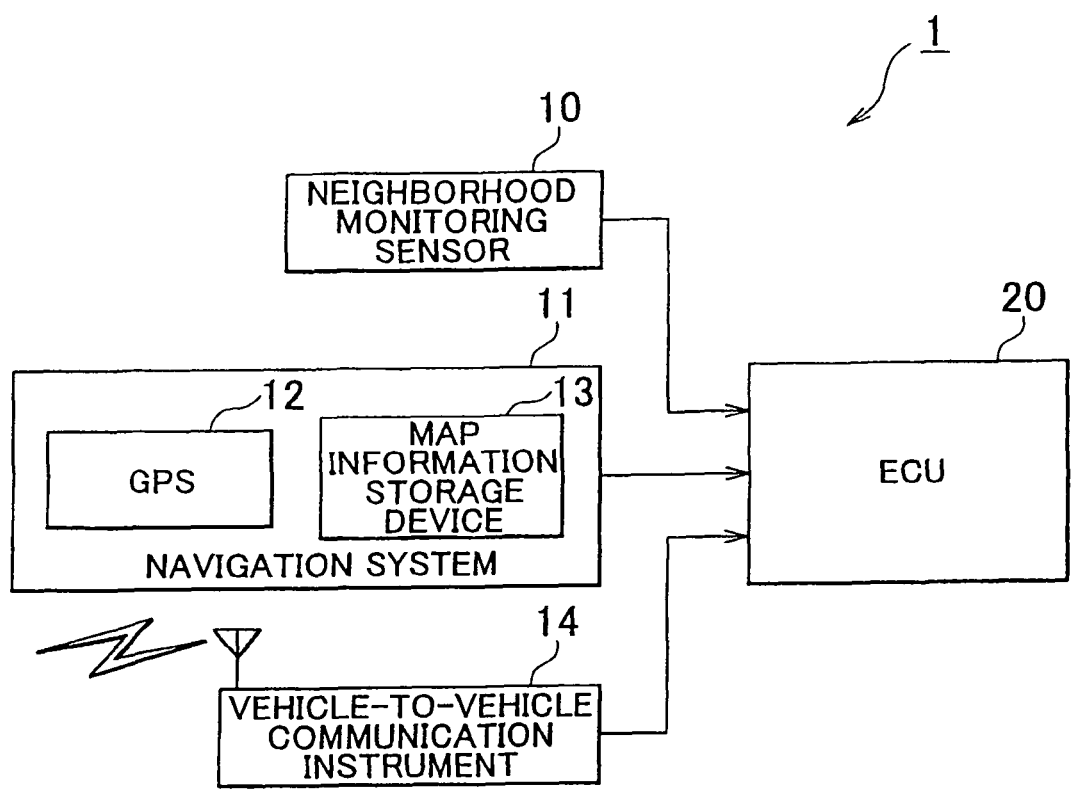

VICINITY ENVIRONMENT ESTIMATION DEVICE WITH BLIND REGION PREDICTION, ROAD DETECTION AND INTERVEHICLE COMMUNICATION

FIELD OF THE INVENTION

The invention relates to a vicinity environment estimation device, a control method for the vicinity environment estimation device, and a vicinity environment estimation system that employs the vicinity environment estimation device.

BACKGROUND OF THE INVENTION

A technology of detecting a vehicle traveling in the vicinity around a host vehicle and notifies a user of a result of the detection is disclosed in Japanese Patent Application Publication No. 2005-115637 (JP-A-2005-115637). In this technology, besides the forward vehicle information acquired by a radar device mounted in the host vehicle, the vehicle information acquired by a radar device mounted in another vehicle traveling in the neighborhood of the host vehicle and position information of the another vehicle are acquired via a vehicle-to-vehicle communication instrument, and the vehicle position is specifically determined by mapping the vehicle position shown by the forward vehicle information and by the communication vehicle information acquire via the vehicle-to-vehicle communication instrument.

The foregoing technology cannot cover all the directions merely by using the radar device mounted in the host vehicle, and therefore also uses the communication vehicle information acquired via the vehicle-to-vehicle communication instrument to auxiliary acquire information about regions outside the detectable regions of the radar device of the host vehicle. However, the radar device mounted in the another vehicle also has undetectable regions. Besides, it is not necessarily the case that all the vehicles traveling in the vicinity of the host vehicle are equipped with radar devices and vehicle-to-vehicle communication instruments that send communication vehicle information. Therefore, according to the foregoing technology, there is a possibility of a not-detected vehicle being present in the neighborhood of the host vehicle.

DISCLOSURE OF THE INVENTION

The invention provides a vicinity environment estimation device, a control method for the vicinity environment estimation device, and a vicinity environment estimation system which are capable of estimating the presence of an obstacle, such as vehicle or the like, in a region that cannot be directly detected by a neighborhood monitoring sensor.

A first aspect of the invention relates to a vicinity environment estimation device. This vicinity environment estimation device includes: an obstacle detection portion that detects an obstacle present in a vicinity of a host vehicle; a no-entry region acquisition portion that acquires an untravelable region where it is not possible for a vehicle to travel; and an estimation portion that, when a closed region surrounded by detectable regions of the plurality of obstacle detection portions and the untravelable region acquired by the no-entry region acquisition portion is formed, estimates presence of an obstacle in the closed region by managing the closed region and a result of detection of the obstacle detection portions in a time-series fashion.

According to the vicinity environment estimation device in accordance with the first aspect of the invention, a closed region surrounded by detectable regions of an obstacle detection portion and an untravelable region acquired via the no-entry region acquisition portion, and results of detection of the obstacle detection portions are managed in a time-series fashion. Since the closed region is a region surrounded by detectable regions of obstacle detection portions and an untravelable region where vehicles cannot travel, an obstacle entering or exiting the closed region inevitably passes through the detectable region of an obstacle detection portion. Therefore, by managing in a time-series fashion, that is, substantially continuously monitoring, the entry/exit of obstacles, such as vehicles and the like, into/from the closed region, it becomes possible to estimate the presence of an obstacle in the closed region that cannot be detected by the obstacle detection portions.

The vicinity environment estimation device may further include a vehicle-to-vehicle communication instrument that receives a result of detection of obstacle detection portions mounted in another vehicle and detectable regions of the obstacle detection portions with the another vehicle. The vehicle-to-vehicle communication instrument may receive the result of detection and information about the detectable regions from the another vehicle. When a closed region surrounded by the detectable regions of the another vehicle which is received by the vehicle-to-vehicle communication instrument, the detectable regions of the host vehicle, and the untravelable region is formed, the estimation device may estimate presence of an obstacle in the closed region by managing, in a time-series fashion, the closed region and the result of detection of the obstacle detection portions mounted in the host vehicle and the another vehicle.

In this case, the closed region surrounded by the detectable regions of the another vehicle the information about which is received by the vehicle-to-vehicle communication instrument, the detectable regions of the obstacle detection portion mounted in the host vehicle, and the no-entry region acquisition portion, and the results of detection of the obstacle detection portions mounted in the host vehicle and in the another vehicle are managed in a time-series fashion. Since the closed region is a region surrounded by detectable regions of the another vehicle, detectable regions of the host vehicle, and an untravelable region where vehicles cannot travel, an obstacle entering or existing the closed region inevitably passes through a detectable region of an obstacle detection portion mounted in the host vehicle or the another vehicle. Therefore, by managing in a time-series fashion, that is, substantially continuously monitoring, the entry/exit of obstacles, such as vehicles and the like, into/from the closed region, it becomes possible to estimate the presence of an obstacle in the closed region that cannot be detected by the obstacle detection portions.

The estimation portion may periodically acquire a result of detection of the obstacle detection portions and a result of acquisition of the no-entry region acquisition portion, and may perform management in a time-series fashion by comparing the results of nth acquisition by the estimation portion and the results of (n−1)th acquisition by the estimation portion.

The estimation portion may estimate presence of an obstacle in the closed region based on a size of the closed region.

Obstacles, such as vehicles and the like, have a certain size. Therefore, for example, in the case where the size of a closed region is smaller than the size of obstacles, such as vehicles or the like, it may be determined that no obstacle is present in the closed region. Besides, by comparing the size of a closed region and the size of an obstacle, the kind and the number of obstacles that can be present in the closed region may be estimated. Besides, the vicinity environment estimation device may further include a shape information recording portion that has information about a shape of the obstacle. In this case, the estimation portion may estimate the presence of the obstacle in the closed region by comparing a shape of the closed region and the shape of the obstacle that the shape information recording portion has. Besides, the estimation portion may also estimate that no obstacle is present in the closed region when the shape of the closed region is smaller than the shape of the obstacle that the shape information recording portion has.

Besides, the estimation portion may estimate that no obstacle is present in the closed region when the closed region is formed from a state where the size of the closed region is zero.

For example, in a situation where another vehicle overtakes the host vehicle, passing by a side of the host vehicle, detectable regions of the host vehicle and detectable regions of the another vehicle overlap with each other before a closed region is formed. Specifically, the closed region is formed from a state where the size of the closed region is zero. In the case where the size of a closed region is zero, it can be determined that no obstacle can be present in the closed region. After that, as long as no obstacle enters the closed region, it can be estimated that no vehicle is present in the closed region.

In the vicinity environment estimation device in accordance with the first aspect of the invention, if a first closed region surrounded by detectable regions of a preceding vehicle which is received by the vehicle-to-vehicle communication instrument, the detectable regions of the host vehicle, and the untravelable region, and a second closed region surrounded by detectable regions of a succeeding vehicle which is received by the vehicle-to-vehicle communication instrument, the detectable regions of the host vehicle, and the untravelable region temporarily join, the estimation portion may estimate presence of an obstacle in each of the first closed region and the second closed region based on a duration of junction of the first closed region and the second closed region.

In the case where a first closed region surrounded by detectable regions of a preceding vehicle, detectable regions of the host vehicle, and an untravelable region, and a second closed region surrounded by detectable regions of a succeeding vehicle, detectable regions of the host vehicle, and an untravelable region temporarily join, the probability of an obstacle moving between the first closed region and the second closed region through the joined portion between the two regions, in which detection of an obstacle is impossible, changes depending on the duration of the junction. In this case, the presence of obstacles in each of the first closed region and the second closed region is estimated on the basis of the duration of the junction. Therefore, by taking into account the probability of an obstacle moving between the first closed region and the second closed region due to the junction that temporarily occurs, it becomes possible to estimate the presence of an obstacle in each of the first closed region and the second closed region after the junction disappears.

It is to be noted herein that the probability of an obstacle moving between the first closed region and the second closed region becomes lower the shorter the duration of the junction of the first closed region and the second closed region. Therefore, the estimation portion may set probability of the obstacle moving between the first closed region and the second closed region lower if the duration of the junction is shorter.

This vicinity environment estimation device may further include a speed estimation portion that estimates a moving speed of an obstacle in the closed region. Then, the speed estimation portion may estimate a first speed that is the moving speed of an obstacle in the first closed region and a second speed that is the moving speed of an obstacle in the second closed region, and the estimation portion may estimate movement of an obstacle between the first closed region and the second closed region by comparing the first speed and the second speed.

A second aspect of the invention relates to a vicinity environment estimation system. This vicinity environment estimation system is constructed of any one of the foregoing vicinity environment estimation devices that is mounted in each of a plurality of vehicles.

According to the vicinity environment estimation system in accordance with the second aspect of the invention, results of detection of the obstacle detection portions mounted in each vehicle and the information about the detectable regions of the obstacle detection portions are exchanged with another vehicle using the vehicle-to-vehicle communication instruments. Therefore, the state of the closed regions formed by the untravelable regions and the detectable regions of the obstacle detection portions mounted in each vehicle, and obstacles, such as vehicles and the like, that enter or exit the closed regions can be managed in a time-series fashion. Therefore, it becomes possible to estimate the presence of obstacles in the closed regions that cannot be detected by the obstacle detection portions.

A third aspect of the invention relates to a control method for a vicinity environment estimation device. In this control method, the vicinity environment estimation device includes an obstacle detection portion that detects an obstacle present in a vicinity of a host vehicle, and a no-entry region acquisition portion that acquires an untravelable region where it is impossible for a vehicle to travel. This control method, when a closed region surrounded by detectable regions of the plurality of obstacle detection portions and the untravelable region acquired by the no-entry region acquisition portion is formed, estimates presence of an obstacle in the closed region by managing, in a time-series fashion, the closed region and a result of detection of the obstacle detection portions.

According to the invention, a construction is provided in which the presence of an obstacle in a closed region surrounded by detectable regions of an detection portion and an untravelable region where vehicles cannot travel is estimated by substantially continuously managing the closed region and results of detection of the obstacle detection portions. Therefore, it becomes possible to estimate the presence of an obstacle, such as a vehicle or the like, in a region that cannot be directly detected by the obstacle detection portions, which typically are neighborhood monitoring sensors.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a block diagram showing a construction of a vicinity environment estimation device in accordance with an embodiment of the invention;

FIG. 7A shows a state where no blind closed region is present, and FIG. 7B shows a state where a blind closed region is formed after the state shown in FIG. 7A;

FIG. 9A shows a state prior to the junction, and FIG. 9B shows a state at the time of the junction.

DETAILED DESCRIPTION OF THE EMBODIMENTS

Figure 2:
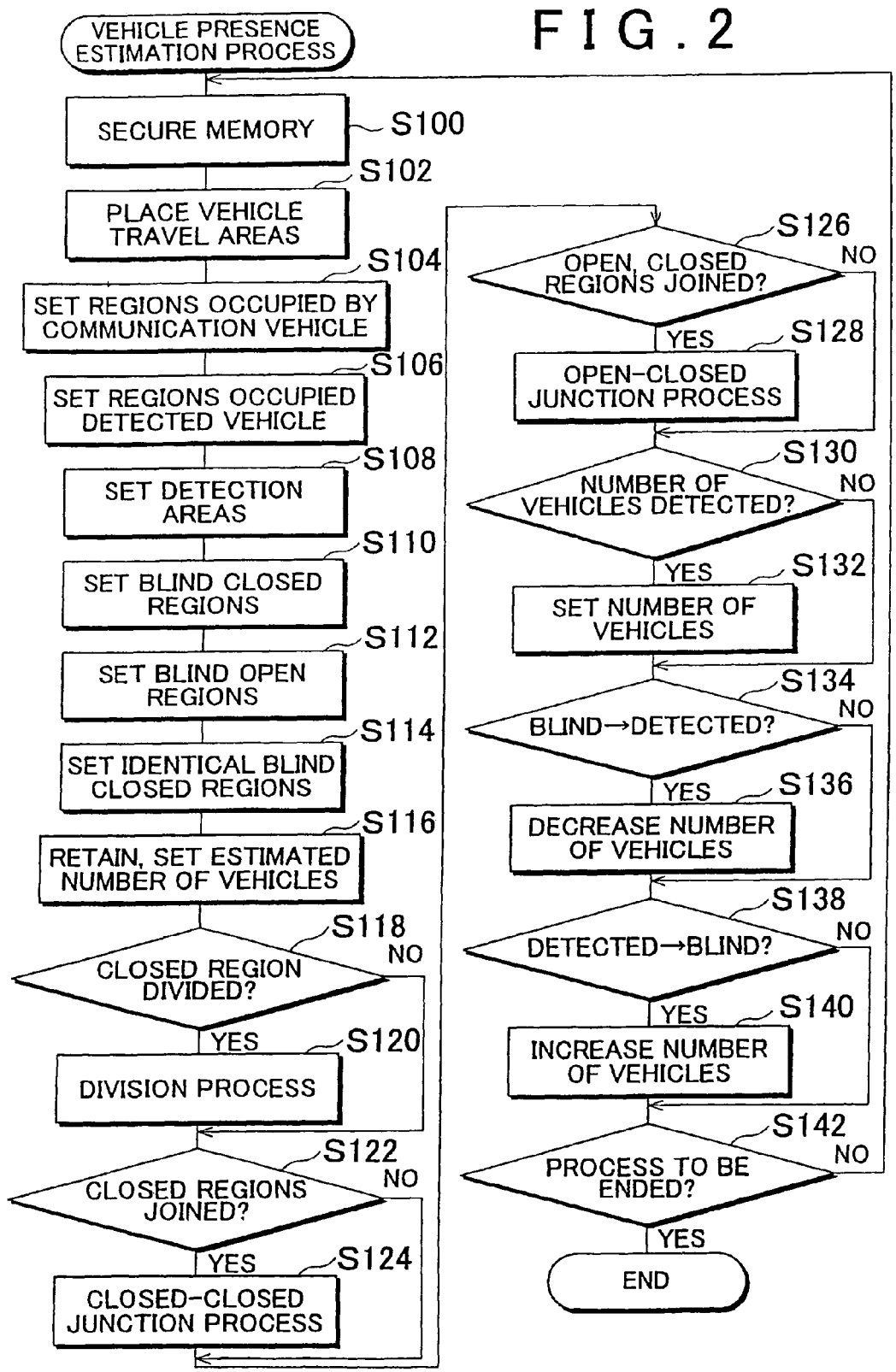
FIG. 2 is a flowchart showing a processing procedure of a vehicle presence estimation process performed by the vicinity environment estimation device.

Embodiments of the invention will be described in detail hereinafter with reference to the drawings. In the drawings, the same or comparable portions are represented by the same reference characters.

Firstly, with reference to FIG. 1, a construction of a vicinity environment estimation device 1 in accordance with an embodiment of the invention will be described. FIG. 1 is a block diagram showing a construction of the vicinity environment estimation device 1.

The vicinity environment estimation device 1 is mounted in a vehicle (host vehicle), and directly detects an obstacle, such as another vehicle or the like, that is present in a detectable region of a neighborhood monitoring sensor 10. Furthermore, the vicinity environment estimation device 1 detects or estimates travel environments in the host vehicle's neighborhood by estimating the presence of another vehicle in a region in the host vehicle's neighborhood that is not detectable by the neighborhood monitoring sensor 10. Incidentally, a plurality of vicinity environment estimation devices 1 constitute a vicinity environment estimation system.

To that end, the vicinity environment estimation device 1 includes: the neighborhood monitoring sensor 10 that detects other vehicles or the like present in the host vehicle's neighborhood; a car navigation system 11 that acquires road information, position information about the host vehicle, etc.; a vehicle-to-vehicle communication instrument 14 for exchanging information via wireless communication between the host vehicle and other vehicles; an electronic control device (hereinafter, referred to as "ECU") 20 that detects or estimates travel environments in the host vehicle's neighborhood on the basis of information input from the neighborhood monitoring sensor 10, the car navigation system 11 and the vehicle-to-vehicle communication instrument 14; etc.

The neighborhood monitoring sensor 10 detects obstacles, such as other vehicles and the like, that are present in the neighborhood of the host vehicle. Specifically, the neighborhood monitoring sensor 10 can be regarded as an obstacle detection portion. This embodiment has a construction in which four neighborhood monitoring sensors 10 are installed at front, rear, left and right-side sites on the vehicle so as to detect other vehicles that are present forward, rearward, leftward and rightward of the host vehicle. However, the four neighborhood monitoring sensors 10 are not capable of covering the entire periphery around the host vehicle, but there exist regions outside the detection ranges, that is, blind regions, in the neighborhood of the host vehicle. The neighborhood monitoring sensors 10 used herein can be millimeter wave radars, laser radars, image sensors, such as stereo cameras or the like, ultrasonic sensors, etc. In addition, different sensors may also be used in combination. The neighborhood monitoring sensors 10 and the ECU 20 are interconnected by a communication line, for example, CAN (Controller Area Network) or the like, so as to allow mutual data exchange. Results of detection of the neighborhood monitoring sensors 10, including the presence/absence of another vehicle, the position information about another vehicle, etc., are output to the ECU 20 via the communication line.

Briefly, the millimeter wave radar or the laser radar radiates a detection wave, such as an electromagnetic wave in a millimeter wave band or a laser light, forward of the vehicle while scanning in a horizontal direction, and receives a reflected wave from a surface of an obstacle, such as another vehicle or the like, and thereby detects the distance to the vehicle, and the relative speed and direction relative to the vehicle. The millimeter wave radar or the laser radar (neighborhood monitoring sensor 10) detects the direction of an another vehicle using the angles of the reflected waves, and detects the distance thereto using the time from the emission of an electromagnetic wave to the return of a reflected wave, and detects the speed of the another vehicle using the frequency change of the reflected wave (the Doppler effect).

The stereo camera has a pair of CCD cameras that acquire images of obstacles, such as another vehicle or the like, and an image processing portion that detects the another vehicle from the acquired images by image recognition. Thus, the stereo camera extracts another vehicle through the edge extraction, the pattern recognition processing, etc., with respect to the images taken by the CCD cameras. Besides, on the basis of the difference in the position of an obstacle between the left and right-side images acquired, a triangular technique is carried out to find the distance to another vehicle and a lateral displacement from the host vehicle. Then, the relative speed is found from the amount of change of the presently found distance from the distance found in the previous frame.

The car navigation system 11 detects the position of the host vehicle on the basis of GPS satellite signals received by a GPS (Global Positioning System) 12. Besides, the car navigation system 11 calculates the travel distance on the basis of a vehicle speed signal, and detects the vehicle movement direction according to a signal from a gyro sensor. Besides, the car navigation system 11 acquires from a map information storage device 13, such as a built-in hard disk, a DVD disk, etc., information regarding untravelable regions where vehicles cannot travel which exist in the neighborhood of the road on which the host vehicle is traveling, in addition to the road information such as the lane arrangement, the road curvature, etc., of the road on which the host vehicle is traveling, etc. That is, the car navigation system 11 can be regarded as a no-entry region acquisition portion in the invention. The car navigation system 11 is also connected to the ECU 20, so as to output the acquired host vehicle position information, the acquired road information, the acquired untravelable region information, etc., to the ECU 20.

The vehicle-to-vehicle communication instrument 14 is provided for exchanging information, such as results of detection of the neighborhood monitoring sensors 10, the detectable ranges thereof, etc., mutually between the host vehicle and other vehicles by wireless communication. The vehicle-to-vehicle communication instrument 14 has a receiver that receives from other vehicles results of the detection performed by and information about the detectable regions of the neighborhood monitoring sensors mounted in the other vehicles, and a sender that sends to the other vehicles results of the detection and information about the detectable regions of the neighborhood monitoring sensors mounted in the host vehicle.

The vehicle-to-vehicle communication instrument 14 and the ECU 20 are also interconnected by the foregoing communication line and are constructed so as to be able to mutually exchange data. The results of the detection and the information about the detectable regions of the neighborhood monitoring sensors mounted in other vehicles, and the like which are received by the vehicle-to-vehicle communication instrument 14 are transmitted to the ECU 20. Besides, the results of the detection and the information about the detectable regions of the neighborhood monitoring sensors 10 mounted in the host vehicle and the like are transmitted to the vehicle-to-vehicle communication instrument 14 via the communication line.

The ECU 20 is constructed of a microprocessor that performs computations, a ROM that stores programs and the like for causing the microprocessor to execute various processes, a RAM for storing various data, such as computation results and the like, a backup RAM whose stored content is retained by a battery (e.g., a 12-V battery), etc.

When a blind closed region surrounded by the detectable regions of some of the neighborhood monitoring sensors 10 and an untravelable region where vehicles cannot travel which has been acquired by the car navigation system 11 is formed, the ECU 20 estimates the presence of another vehicle in the blind closed region that cannot be directly detected by the neighborhood monitoring sensors 10 by managing in a time-series fashion, that is, substantially continuously monitoring, the entry/exit of other vehicles with respect to the blind closed region. For example, the ECU 20 is able to perform management in a time-series fashion by periodically acquiring results of detection of the neighborhood monitoring sensors 10 and results of acquisition of the car navigation system 11 and then comparing the results obtained in the nth acquisition cycle and the results obtained in the (n−1)th acquisition cycle.

When a blind closed region surrounded by the detectable regions of some of the neighborhood monitoring sensors mounted in another vehicle the information about which is received by the vehicle-to-vehicle communication instrument 14, the detectable regions of some of the neighborhood monitoring sensors 10 mounted in the host vehicle and an untravelable region where vehicles cannot travel is formed, the ECU 20 estimates the presence of another vehicle in the blind closed region that cannot be directly detected by the neighborhood monitoring sensors 10, by substantially continuously managing the entry/exit of other vehicles with respect to the blind closed region. That is, the ECU 20 can be regarded as an estimation portion in the invention.

Figure 3:
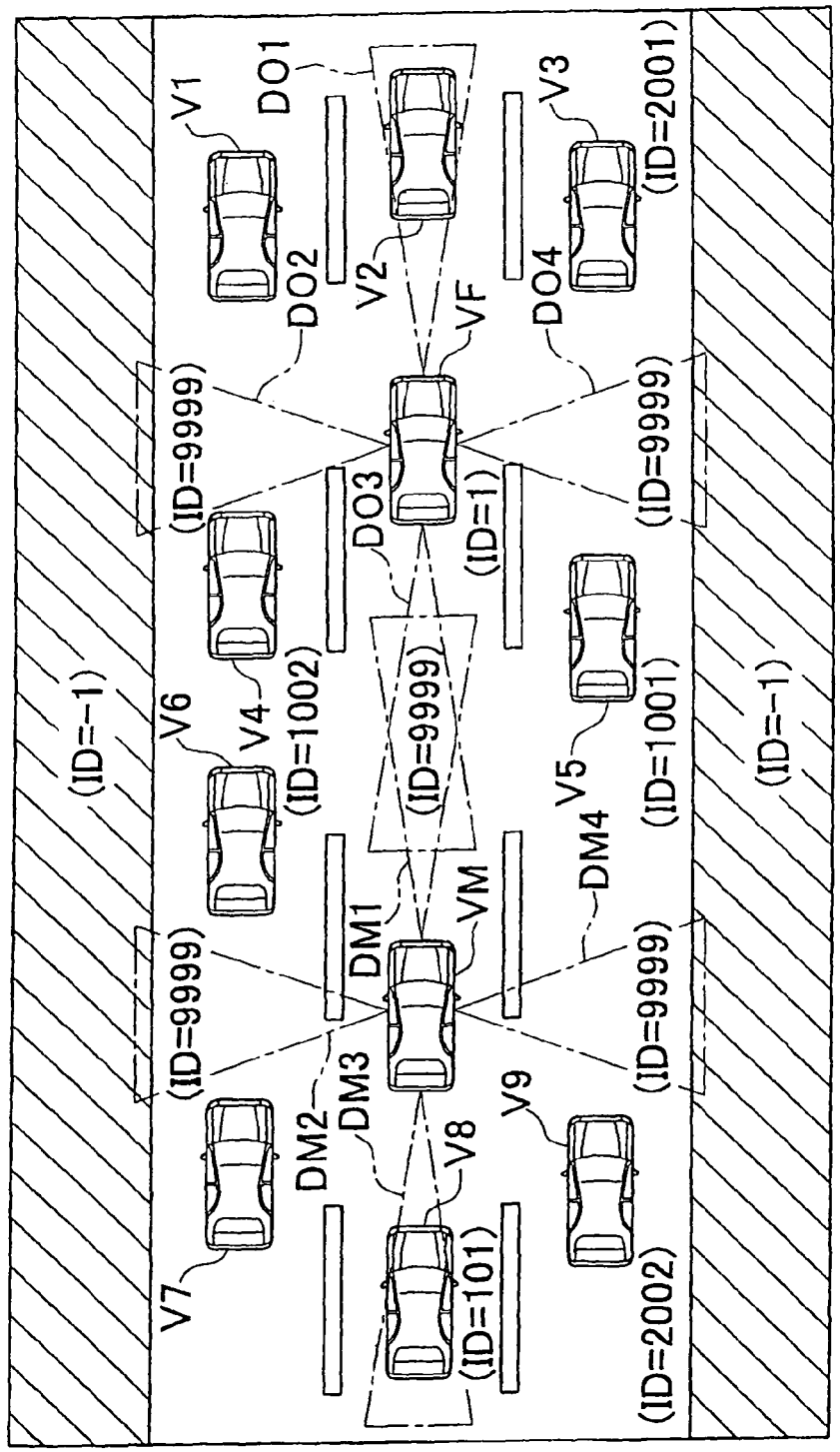
FIG. 3 is a diagram for describing the vehicle presence estimation process performed by the vicinity environment estimation device.

Next, with reference to FIGS. 2 and 3, operations of the vicinity environment estimation device 1 in the first embodiment of the invention will be described. FIG. 2 is a flowchart showing a processing procedure of a vehicle presence estimation process performed by the vicinity environment estimation device 1 in this embodiment. This process is repeatedly executed by the ECU 20 at predetermined timing after the turning on of the electric power until the turning off thereof. FIG. 3 is a diagram for describing a vehicle presence estimation process performed by the vicinity environment estimation device 1. The description herein will be made in conjunction with an example situation as shown in FIG. 3 in which a host vehicle VM and a preceding vehicle VF that are both equipped with the neighborhood monitoring sensors 10 and the vehicle-to-vehicle communication instrument 14 are traveling in tandem, and in their vicinity, there are vehicles V1 to V9 not equipped with the neighborhood monitoring sensors 10 or the vehicle-to-vehicle communication instrument 14.

In step S100, a map of object regions for the detection/estimation of the neighborhood of the host vehicle VM is secured in a memory of the ECU 20 (or a peripheral device). Concretely, a region that is 50 m broad and 200 m long (2 Mbytes) is placed in the memory, with every one capacity (e.g., two bytes) corresponding to a square-shape unit region of 10 cm square (100 cm$^2$).

Subsequently in step S102, on the basis of the road information acquired from the car navigation system 11, a travelable region where vehicles can travel and untravelable region where vehicles cannot travel are placed in the detection/estimation-object region map. Concretely, in the travelable region (a region other than the hatched regions in FIG. 3), "0" is written into each unit region, and in the untravelable regions (the hatched regions in FIG. 3), "−1" is written into each unit region.

Subsequently in step S104, the positions of the vehicles capable of vehicle-to-vehicle communication (the preceding vehicle VF in this embodiment), among the vehicles traveling in the neighborhood of the host vehicle VM, are acquired via the vehicle-to-vehicle communication, and the region occupied by the vehicle VF is placed in the detection/estimation-object region map. Concretely, in the region occupied by the vehicle VF, the ID number of the vehicle (1, 2, . . . ; and in this embodiment "1") is written.

Subsequently in step S106, the position of the vehicle detected by the neighborhood monitoring sensors 10 mounted in the preceding vehicle VF (the position of the vehicle V8 in this embodiment) is acquired via the vehicle-to-vehicle communication, and the region occupied by the vehicle V8 is placed in the detection/estimation-object region map. Concretely, in the region occupied by the vehicle V8, the ID number of the vehicle (101, 102, . . . ; and in this embodiment, "101") is written. However, with regard to the vehicle whose ID number has been written in step S104, no further writing (overwriting) is not performed.

Subsequently in step S108, the detectable regions DO1 to DO4 of the neighborhood monitoring sensors 10 mounted in the preceding vehicle VF are acquired by vehicle-to-vehicle communication, and the detectable regions DO1 to DO4 are placed in the detection/estimation-object region map. Concretely, a vehicle absence ID number "9999" is written into the detectable regions DO1 to DO4. However, in the regions where writing has been performed in steps S104 and S106, no further writing is performed.

Subsequently in step S110, closed regions surrounded by the untravelable regions (−1), the detectable regions DM1 to DM4 of the neighborhood monitoring sensors 10 mounted in the host vehicle VM, and the detectable regions DO1 to DO4 of the neighborhood monitoring sensors 10 mounted in the preceding vehicle VF, that is, the closed travelable regions (0) that cannot be directly detected by the neighborhood monitoring sensors 10, are placed as blind closed regions in the detection/estimation-object region map. Concretely, blind closed region ID numbers (1001, 1002, . . . ; and in this embodiment, "1001" and "1002") are written into the blind closed regions.

Next, in step S112, undetectable regions that are not closed, that is, travelable regions (0) in contact with a boundary line of the detection/estimation-object region map, are placed as blind open regions in the detection/estimation-object region map. Concretely, in the blind open regions, blind open region ID numbers (2001, 2002, . . . ; and in this embodiment, "2001" and "2002") are written.

Subsequently in step S114, the list of the blind closed regions detected in the previous cycle and the list of the blind closed regions detected in the present cycle are compared, and blind closed regions that contain the same region are regarded as identical blind closed regions, and are assigned with identical ID numbers.

Subsequently in step S116, for each identical blind closed region, a minimum number of vehicles that are estimated to be present within the blind closed region (hereinafter, referred to as "minimum number of estimated-to-be-present vehicles") and a maximum number of vehicles that are estimated to be present within the blind closed region (hereinafter, referred to as "maximum number of estimated-to-be-present vehicles") are retained. Incidentally, if there is no information that allows estimation regarding the minimum number of estimated-to-be-present vehicles or the maximum number of estimated-to-be-present vehicles, "0" is set as the minimum number of estimated-to-be-present vehicles, and "unknown (e.g., 9999)" is set as the maximum number of estimated-to-be-present vehicles.

Next, in step S118, the previously detected blind closed regions and the presently detected blind closed regions are compared, and it is determined whether or not a blind closed region has been divided by, for example, the detectable region of a neighborhood monitoring sensor 10. If it is determined that a blind closed region has been divided, the process proceeds to step S120. On the other hand, if it is determined that no blind closed region has been divided, the process proceeds to step S122.

In step S120, a division process is executed. Specifically, as the maximum numbers of estimated-to-be-present vehicles for the blind closed regions generated by the division, the same value as the maximum number of estimated-to-be-present vehicles prior to the division is copied. On the other hand, "0" is set as the minimum numbers of estimated-to-be-present vehicles for the blind closed regions generated by the division. After that, the process proceeds to step S122.

In step S122, the blind closed regions detected in the previous cycle and the blind closed regions detected in the present cycle are compared, and it is determined whether or not a plurality of blind closed regions have joined due to, for example, a change of the detectable regions of the neighborhood monitoring sensors 10, or the like. In the case where it is determined that a plurality of blind closed regions have joined, the process proceeds to step S124. On the other hand, if it is determined that junction of blind closed regions has not occurred, the process proceeds to step S126.

In step S124, a process of joining blind closed regions (hereinafter, referred to as "closed-closed junction process") is executed. Specifically, as the maximum number of estimated-to-be-present vehicles for a post-junction blind closed region, a value obtained by summing the maximum numbers of estimated-to-be-present vehicles of the pre-junction blind closed regions is set. On the other hand, as the minimum number of estimated-to-be-present vehicles for the post-junction blind closed region, a value obtained by summing the minimum numbers of estimated-to-be-present vehicles of the pre-junction blind closed regions is set. After that, the process proceeds to step S126.

In step S126, it is determined whether or not a blind closed region and a blind open region have joined. In the case where it is determined that a blind closed region and a blind open region have joined, the process proceeds to step S128. On the other hand, if it is determined that no junction of a blind closed region and a blind open region has occurred, the process proceeds to step S130.

In step S128, a process of joining the blind open region and the blind closed region (hereinafter, referred to as "open-closed junction process") is executed. Specifically, in the case where a blind closed region and a blind open region have joined, the joined region is excluded from the continuous management objects, and the ID assigned thereof is cancelled. After that, the process proceeds to step S130.

In step S130, it is determined whether or not the number of vehicles present in a blind closed region has detected by, for example, an infrared sensor of a traveling vehicle detection system or the like installed on the road. In the case where the number of vehicles has been detected, the detected number of vehicles is set in step S132 as each of the maximum number of estimated-to-be-present vehicles and the minimum number of estimated-to-be-present vehicles for the blind closed region. After that, the process proceeds to step S134. On the other hand, if the number of vehicles has not been detected, the process proceeds to step S134 without setting a number of vehicles.

In step S134, it is determined whether or not a vehicle has been newly detected in the detectable regions DM1 to DM4 of the neighborhood monitoring sensors 10 mounted in the host vehicle VM and/or the detectable regions DO1 to DO4 of the neighborhood monitoring sensors 10 mounted in the preceding vehicle VF. In the case where a vehicle has been newly detected in any one of the detectable regions DM1 to DM4 and DO1 to DO4, the process proceeds to step S136. On the other hand, if no vehicle has been newly detected, the process proceeds to step S138.

In step S136, it is determined which one of the regions in the detection/estimation-object region map the newly detected vehicle has come from. If it is determined that the newly detected vehicle has come from a blind closed region, the maximum number of estimated-to-be-present vehicles and the minimum number of estimated-to-be-present vehicles of that blind closed region are set to the values obtained by the subtraction of the number of the newly detected vehicles. After that, the process proceeds to step S138.

In step S138, it is determined whether or not any one of the vehicles detected, up to the previous cycle, in the detectable regions DM1 to DM4 of the neighborhood monitoring sensors 10 mounted in the host vehicle VM and/or the detectable regions DO1 to DO4 of the neighborhood monitoring sensors 10 mounted in the preceding vehicle VF has become undetectable in the present cycle. If any one of the vehicles previously detected in the detectable regions DM1 to DM4 and DO1 to DO4 has become undetectable, the process proceeds to step S140. On the other hand, if none of the vehicles has become undetectable, the process proceeds to step S142.

In step S140, it is determined which one of the regions in the detection/estimation-object region map the vehicle that has become undetectable in the present cycle has moved to. If it is determined that the vehicle has moved to a blind closed region, the maximum number of estimated-to-be-present vehicles and the minimum number of estimated-to-bepresent vehicles regarding the blind closed region are set to values obtained by adding thereto the number of vehicles detected. After that, the process proceeds to step S142.

In step S142, it is determined whether or not to end the process. That is, in the case where a condition for ending this process is satisfied, this process is temporarily exited. On the other hand, if the condition for ending the process is not satisfied, the process proceeds to step S102. Thus, until the ending condition is satisfied, the process of steps S102 to S142 is repeatedly executed.

According to this embodiment, the blind closed regions surrounded by the detectable regions of another vehicle VF received by the vehicle-to-vehicle communication instrument 14, the detectable regions of the neighborhood monitoring sensors 10 mounted in the host vehicle VM and the untravelable regions acquired by the car navigation system 11, and results of detection by the neighborhood monitoring sensors 10 mounted in the host vehicle VM and the another vehicle VF are substantially continuously managed. Since the blind closed regions are surrounded by the detectable regions of the another vehicle VF, the detectable regions of the host vehicle VM, and the untravelable regions where vehicles cannot travel, a vehicle inevitably passes through one of the detectable regions of the neighborhood monitoring sensors 10 mounted in the host vehicle VM and the another vehicle VF in order to enter or exit a blind closed region. Therefore, by continuously managing the entry/exit of an obstacle, such as a vehicle or the like, with respect to the blind closed regions, it becomes possible to estimate the number of vehicles in the blind closed regions that cannot be directly detected by the neighborhood monitoring sensors 10.

Furthermore, according to the embodiment, a vicinity environment estimation system is constituted by the vicinity environment estimation device 1 mounted in the host vehicle VM and the vicinity environment estimation device 1 mounted in the another vehicle VF. According to this vicinity environment estimation system, since results of detection of the neighborhood monitoring sensors 10 mounted in each vehicle and the information about the detectable regions of the neighborhood monitoring sensors 10 are exchanged between the host vehicle VM and the another vehicle VF using the vehicle-to-vehicle communication instruments 14, the state of the blind closed regions formed by the untravelable regions and the detectable regions of the neighborhood monitoring sensors 10 mounted in each vehicle, and obstacles, such as vehicles or the like, that enter or exit the blind closed regions can be continuously managed. Therefore, it becomes possible to estimate the number of vehicles in the blind closed regions that cannot be detected by the neighborhood monitoring sensors 10.

The foregoing embodiment has been described in conjunction with an example situation in which the host vehicle VM and the preceding vehicle VF in both of which the neighborhood monitoring sensors 10 and the vehicle-to-vehicle communication instrument 14 are mounted are traveling in tandem. However, in the case where the blind regions are formed by the detectable regions and the untravelable regions of the neighborhood monitoring sensors 10 mounted in the host vehicle VM, the number of vehicles in the blind closed regions can be estimated via the vicinity environment estimation device 1 alone. Specifically, in this case, the blind closed regions surrounded by the detectable regions of the neighborhood monitoring sensors 10 and the untravelable regions acquired via the car navigation system 11, and results of detection by the neighborhood monitoring sensors 10 are continuously managed. Since the blind closed regions are surrounded by the detectable regions of some of the neighborhood monitoring sensors 10 and an untravelable region where vehicles cannot travel, the continuous management of the entry/exist of obstacles, such as vehicles and the like, with respect to the blind closed regions makes it possible to estimate the number of vehicles in the blind closed regions that cannot be detected by the neighborhood monitoring sensors 10.

Furthermore, according to the embodiment, since a blind closed region in which no vehicle is present can be estimated, it becomes possible to effectively utilize the blind closed region in which no vehicle is present, for example, when a control project for vehicle groups is to be formed.

Figure 4:
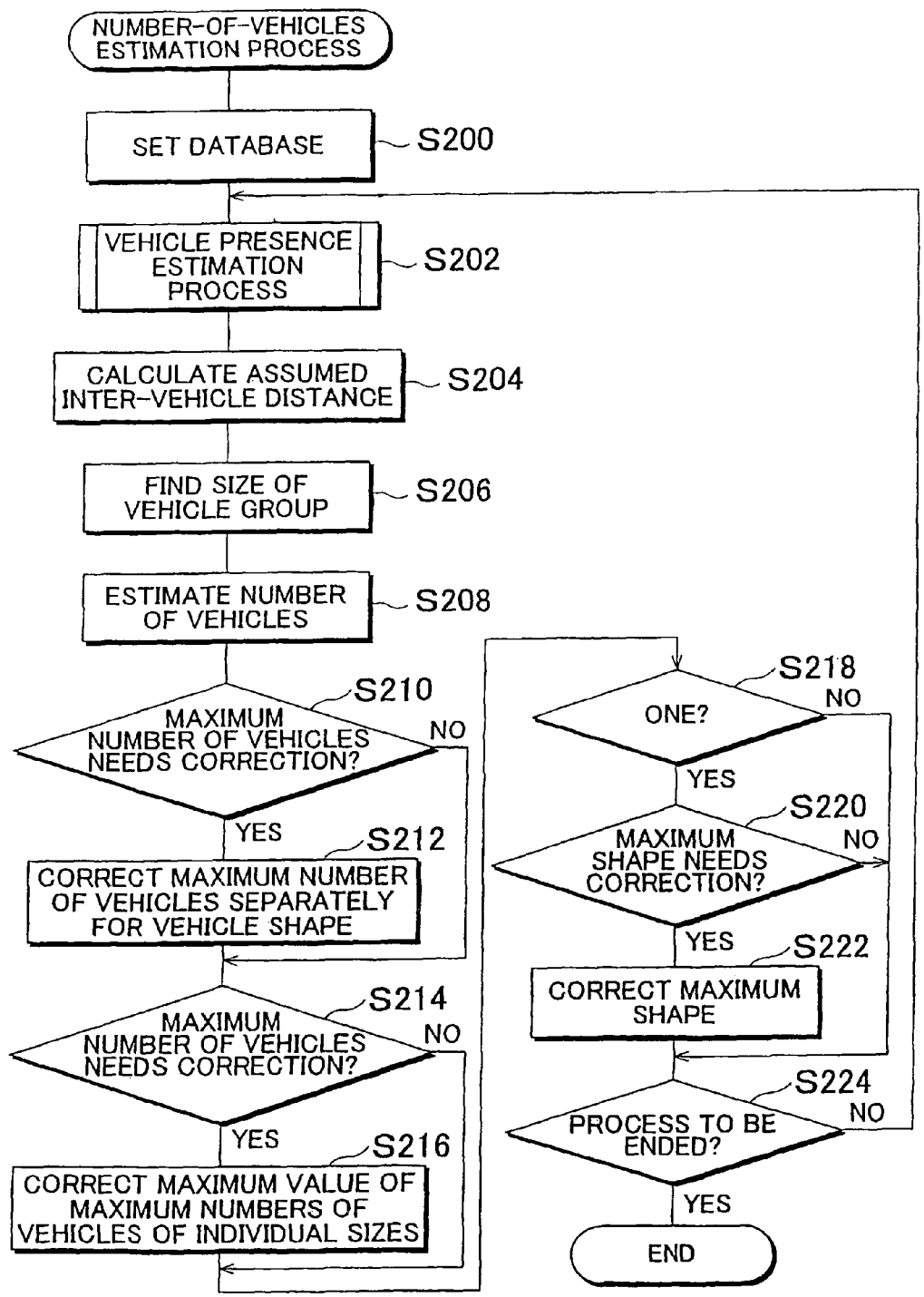
FIG. 4 is a flowchart of a processing procedure of a number-of-vehicles-or-the-like estimation process performed by the vicinity environment estimation device.
Figure 5:
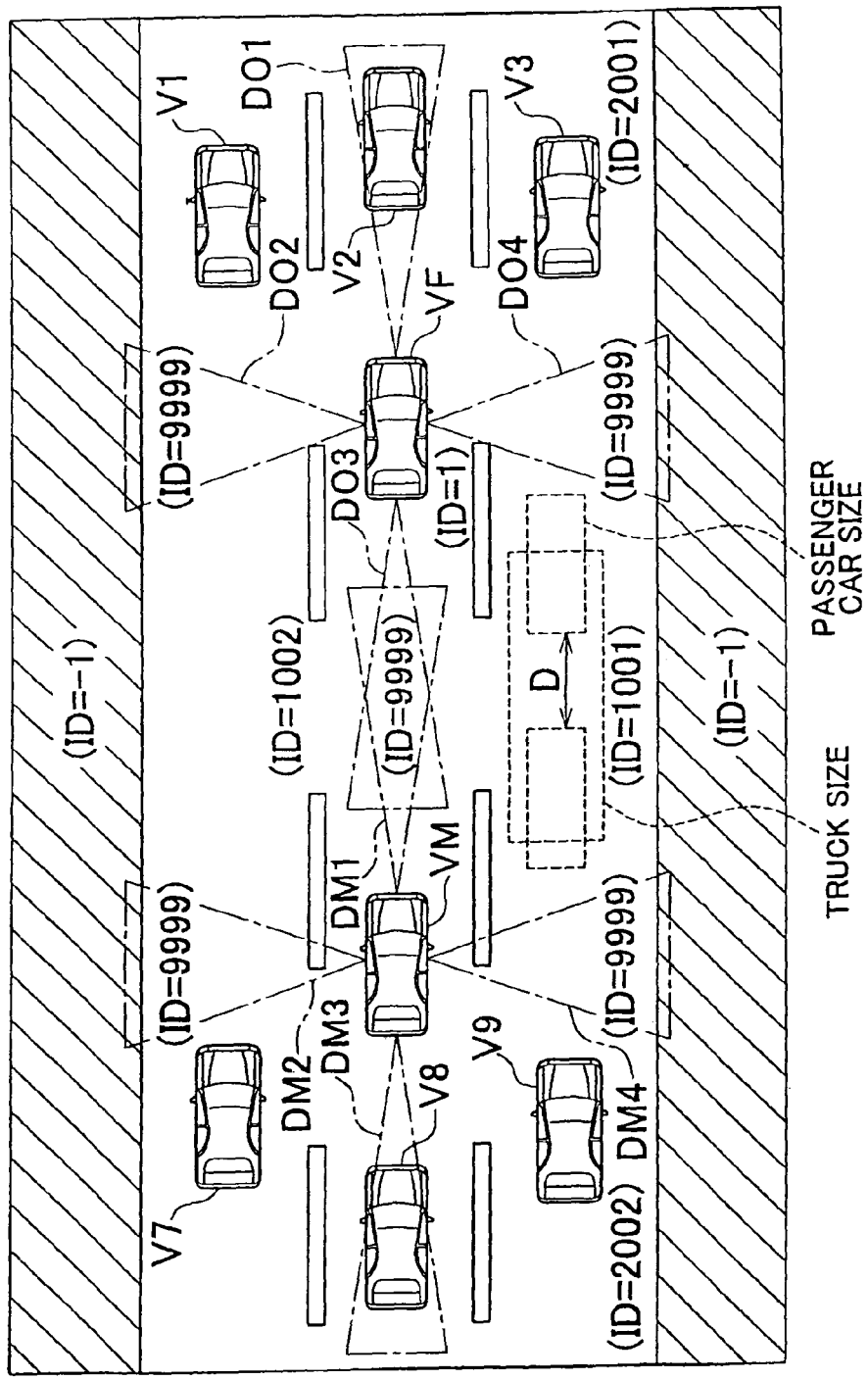
FIG. 5 is a diagram for describing the number-of-vehicles-or-the-like estimation process performed by the vicinity environment estimation device.

Next, with reference to FIGS. 4 and 5 in combination, a number-of-vehicles estimation process performed by the vicinity environment estimation device 1 in a second embodiment of the invention will be described. FIG. 4 is a flowchart showing a processing procedure of the number-of-vehicles-or-the-like estimation process performed by the vicinity environment estimation device 1 in this embodiment. This process, too, is executed by the ECU 20 repeatedly at predetermined timing after the turning on of the electric power until the turning off thereof. FIG. 5 is a diagram for describing the number-of-vehicles-or-the-like estimation process performed by the vicinity environment estimation device. In FIG. 5, the component elements that are the same as or comparable to those shown in FIG. 3 are assigned with the same reference characters.

In step S200, a database regarding vehicles that can travel on a road on which the host vehicle VM is presently traveling (a list of representative vehicle models and sizes) is read in.

Subsequently in step S202, the foregoing vehicle presence estimation process (step S100 to S142) is executed to continuously manage the blind closed regions. The vehicle presence estimation process is as described above, and the description thereof is omitted herein.

Next, in step S204, an assumed inter-vehicle distance is set. Concretely, an assumed inter-vehicle distance D is found by multiplying an average speed (Vave) of a group of vehicles in the neighborhood of the host vehicle VM by an assumed minimum TTC (Time to Collision, e.g., 1 second).

Subsequently in step S206, the size of the vehicle group combining the vehicle data read in the step S200 and the assumed inter-vehicle distance D found in step S204 is found.

Subsequently in step S208, it is determined separately for each vehicle shape whether or not the vehicle group whose size has been found in step S206 can be contained in the blind closed regions, whereby the numbers of vehicles that can be present in the blind closed regions are estimated separately for each vehicle shape. More specifically, the determination is performed by comparing the area of the blind closed regions and the area of the vehicle group or comparing the shape of the blind closed regions and the shape of the vehicle group. In the example shown in FIG. 5, it is determined that one truck or two passenger vehicles can be present in the blind closed region (ID=1001). Incidentally, a construction in which a combination of different vehicle shapes may also be possible.

Next, in step S210, it is determined separately for each blind closed region whether or not the maximum number of estimated-to-be-present vehicles found in step S208 separately for each vehicle shape is smaller than the presently set maximum number of estimated-to-be-present vehicles of each vehicle shape. In the case where in a blind closed region, the maximum number of estimated-to-be-present vehicles of each vehicle shape is smaller than the presently set value, there is a need to update the maximum number of estimated-to-be-present vehicles of each vehicle shape for that blind closed region, and therefore the maximum number of estimated-to-be-present vehicles of each vehicle shape found in step S208 is set as a maximum number of estimated-to-be-present vehicles for that blind closed region (step S212). On the other hand, if in each blind closed region, the maximum number of estimated-to-be-present vehicles of each vehicle shape is greater than or equal to the presently set value, the process proceeds to step S214 without updating the maximum number of estimated-to-be-present vehicles of each vehicle shape.

Subsequently in step S214, it is determined separately for each blind closed region whether or not the maximum value of the maximum numbers of estimated-to-be-present vehicles found separately for the individual vehicle shapes in step S208 is smaller than the maximum value of the presently set maximum numbers of estimated-to-be-present vehicles of the individual vehicle shapes. In the case where in a blind closed region, the maximum value of the maximum numbers of estimated-to-be-present vehicles of the individual vehicle shapes is smaller than the presently set maximum value, there is a need to update the maximum value of the maximum numbers of estimated-to-be-present vehicles of that blind closed region, and therefore, the maximum value of the maximum numbers of estimated-to-be-present vehicles of the individual vehicle shapes found in step S208 is set as a maximum value of the maximum numbers of estimated-to-be-present vehicles of the individual vehicle shapes for the blind closed region (step S216). On the other hand, if in each blind closed region, the maximum value of the maximum numbers of estimated-to-be-present vehicles of the individual vehicle shapes is greater than or equal to the presently set value, the process proceeds to step S218 without updating the maximum value of the maximum numbers of estimated-to-be-present vehicles of the individual vehicle shapes.

In step S218, it is determined separately for each blind closed region whether or not the maximum number of estimated-to-be-present vehicles of the blind closed region is one. In the case where in each blind closed region, the maximum number of estimated-to-be-present vehicles is one, the process proceeds to step S220. On the other hand, if the maximum number of estimated-to-be-present vehicles is not one, the process proceeds to step S224.

In step S220, a maximum value regarding the vehicle shape (hereinafter, referred to as "estimated maximum vehicle shape") is found on the basis of the result of determination in step S210, and it is determined whether or not this estimated maximum vehicle shape is smaller than the currently set numerical value. In the case where in a blind closed region, the estimated maximum vehicle shape is smaller than the currently set numerical value, there is a need to update the estimated maximum vehicle shape, and therefore the estimated maximum vehicle shape thus found is set as an estimated maximum vehicle shape for that blind closed region (step S222). On the other hand, if in each blind closed region, the estimated maximum vehicle shape is greater than or equal to the currently set numerical value, the process proceeds to step S224.

In step S224, it is determined whether or not to end the process. That is, in the case where a condition for ending this process is satisfied, this process is temporarily exited. On the other hand, if the condition for ending the process is not satisfied, the process proceeds to step S202. Thus, until the ending condition is satisfied, the process of steps S202 to S224 is repeatedly executed.

According to this embodiment, by comparing the size of a blind closed region and the shape or size of vehicles, the kind and number of vehicles that can be present in that blind closed region can be estimated. Besides, in the case where the size of a blind closed region is smaller than the size of the vehicle, it can be determined that no vehicle is present in the blind closed region.

Furthermore, according to this embodiment, a behavior prediction for vehicles in the neighborhood and a control project for automated vehicles can be formed by taking into account the maximum vehicle size in each blind closed region. Therefore, for example, when a control project for vehicle groups is to be formed, it is possible to form a control project in which a space is secured on the assumption that, from a blind closed region in which vehicles are estimated to be present, a vehicle of the maximum vehicle size will come to appear in the vehicle group.

Figure 6:
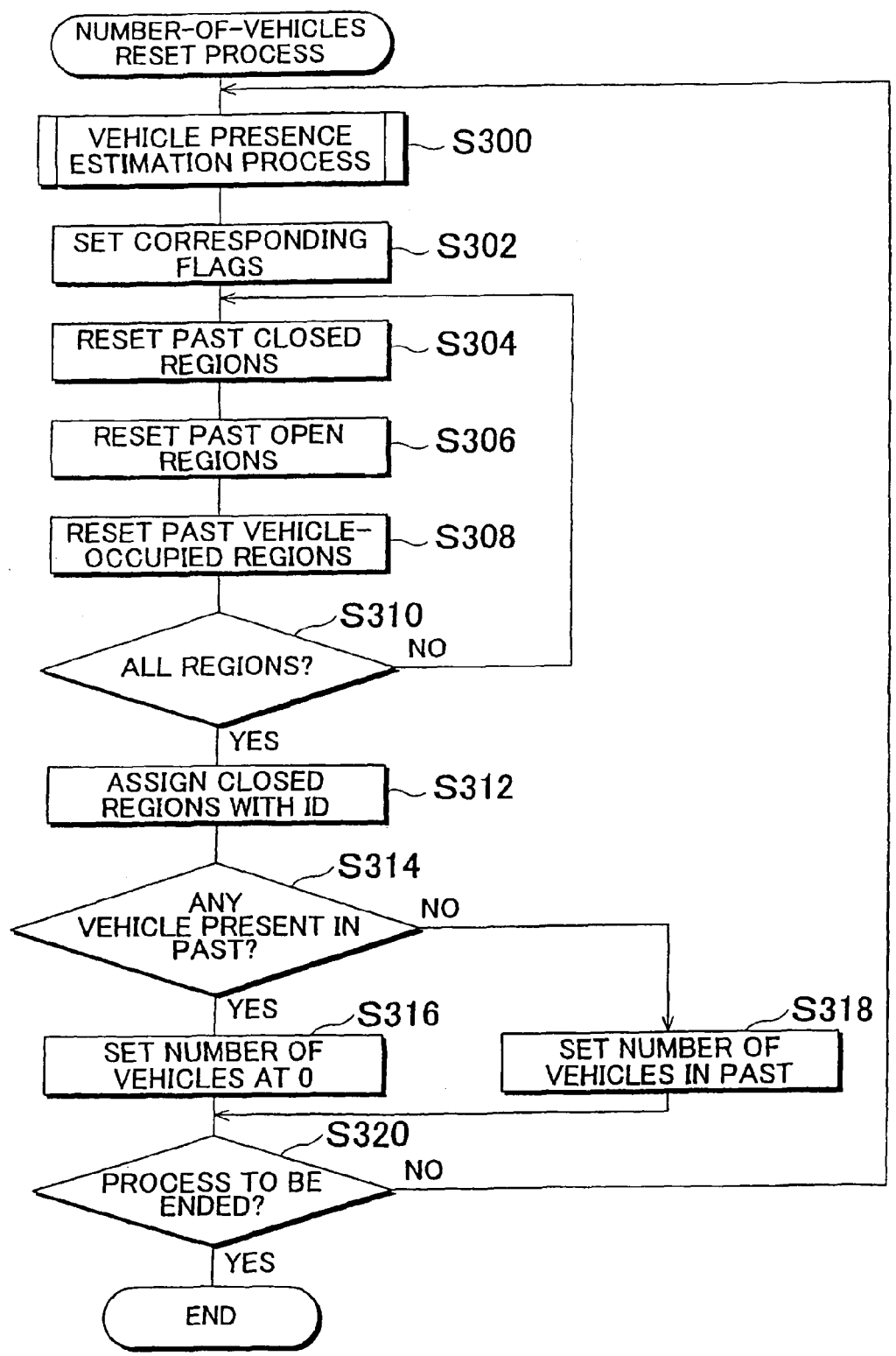
FIG. 6 is a flowchart showing a processing procedure of a number-of-vehicles resetting process performed by the vicinity environment estimation device.
Figure 7A:
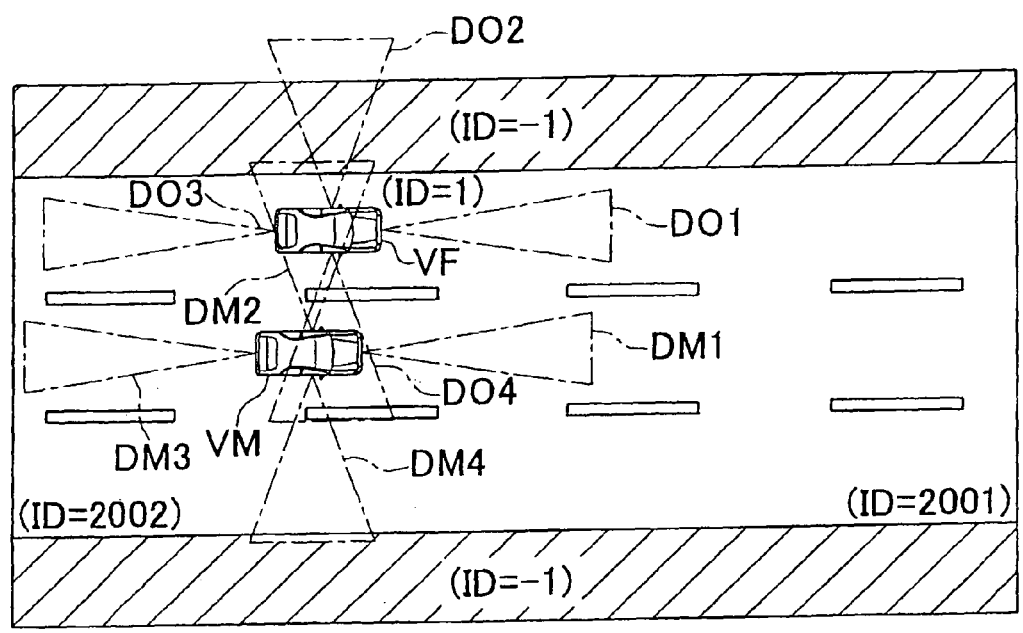
FIGS. 7A and 7B are, diagrams for describing the number-of-vehicles resetting process performed by the vicinity environment estimation device.
Figure 7B:
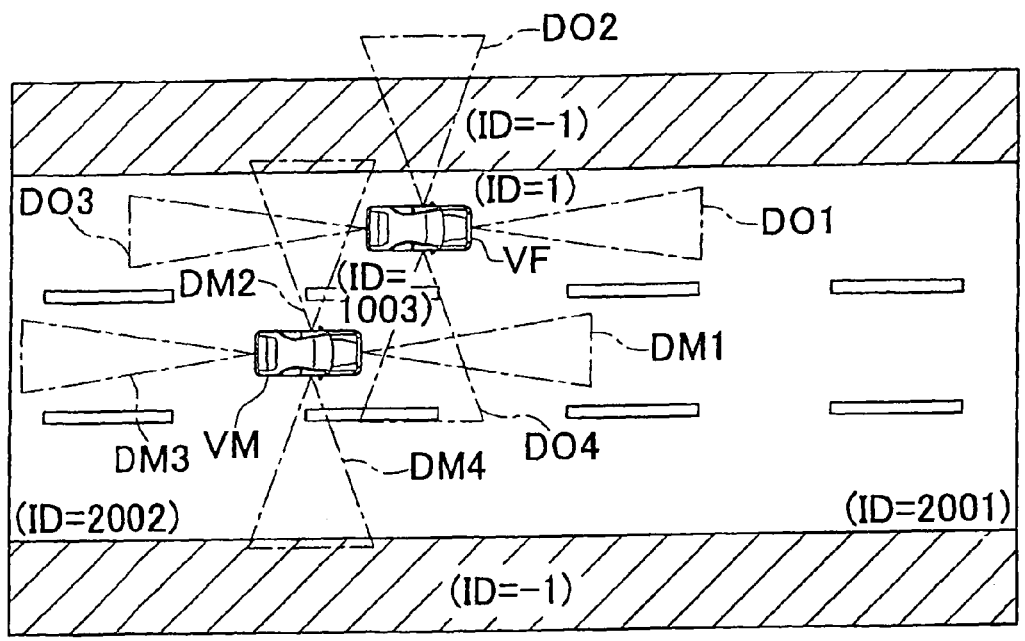

Next, with reference to FIGS. 6, 7A and 7B in combination, a number-of-vehicles resetting process performed by a vicinity environment estimation device 1 in accordance with a third embodiment of the invention will be described. FIG. 6 is a flowchart showing a processing procedure of the number-of-vehicles resetting process performed by the vicinity environment estimation device 1. This process is repeatedly executed by the ECU 20 at predetermined timing after the turning on of the electric power until the turning off thereof. FIGS. 7A and 7B are diagrams for describing the number-of-vehicles resetting process executed by the vicinity environment estimation device 1. FIG. 7A shows a state where no blind closed region is present, and FIG. 7B shows a state where a blind closed region is formed after the state as shown in FIG. 7A. In FIGS. 7A and 7B, the component elements that are the same as or comparable to those shown in FIG. 3 are assigned with the same reference characters.

In step S300, a process obtained by subtracting the process of step S114 from the foregoing vehicle presence estimation process (step S100 to S142) is executed, and therefore the blind closed regions are continuously managed. The vehicle presence estimation process is as described above, and description thereof will be omitted.

Subsequently in step S302, flags that correspond to the blind closed regions detected in the present cycle (hereinafter, referred to as "corresponding flags") are set (set at "1"). Subsequently in step S304, of the corresponding flags set in step S302, the flags that correspond to the blind closed regions detected in the previous cycle are reset (set at "0"). In step S306, of the corresponding flags set in step S302, the flags that correspond to the blind open regions detected in the previous cycle are rest (set at "0"). Furthermore, in step S308, of the corresponding flags set in step S302, the flags that correspond to the vehicle-occupied regions detected in the previous cycle are reset (set at "0").

Subsequently in step S310, it is determined whether or not the foregoing process of steps S304 to S308 has been executed with regard to all the regions in the detection/estimation-object region map. When the process has not been performed for all the regions, the process proceeds to step S304. Thus, until the process is completed for all the regions, the process of step S304 to 308 is repeatedly executed. On the other hand, when the process is completed for all the regions, the process proceeds to step S312.

In step S312, in the case where there exists a corresponding flag set (set at "1") in step S302, the blind closed region corresponding to that flag is considered to be new (hereinafter, referred to as "new blind closed region"), and is assigned with a blind closed region ID (see FIG. 7B).

Next, in step S314, it is determined whether or not there was any vehicle in the previous cycle in a region where the new blind closed region has occurred. In the case where no vehicle was present in that region in the previous cycle, "0" is set as the minimum number of estimated-to-be-present vehicles and as the maximum number of estimated-to-be-present vehicles for this new blind closed region (step S316). On the other hand, in the case where one or more vehicle were present in that region in the previous cycle, the number of vehicle present in the previous cycle is set as the minimum number of estimated-to-be-present vehicles and the maximum number of estimated-to-be-present vehicles for the new blind region (step S318).

In step S320, it is determined whether or not to end the process. That is, in the case where a condition for ending this process is satisfied, this process is temporarily exited. On the other hand, if the condition for ending the process is not satisfied, the process proceeds to step S300. Thus, until the ending condition is satisfied, the process of steps S300 to S320 is repeatedly executed.

For example, in a situation where a vehicle VF overtakes the host vehicle, passing by a side of the host vehicle VM, there are cases where detectable regions of the host vehicle VM and detectable regions of the other vehicle VF overlap with each other as shown in FIG. 7A before a blind closed region is formed as shown in FIG. 7B. Specifically, a blind closed region is formed after a state where the size of the blind closed region is zero. In the case where the size of the blind closed region is zero, it can be considered that no vehicle can be present in that blind closed region. After that, as long as no vehicle enters the blind closed region, it can be estimated that no vehicle is present in the blind closed region. Incidentally, even in the case where the size of a blind closed region is zero, it can happen that a vehicle, for example, an emergency vehicle, a motor cycle, etc., is present in the blind closed region. However, in such a case, such a vehicle can be detected via the neighborhood monitoring sensors 10 mounted in the host vehicle VM. Therefore, it suffices that the foregoing estimation be corrected on the basis of results of detection.

According to this embodiment, when the process of finding the correspondence of the blind closed regions (a blind closed region detected in the previous cycle and a blind closed region detected in the present cycle that have substantially the same coordinates are managed with the same ID number), a blind closed region that was not present immediately before the correspondence process, if any is found, is assigned with an estimated number of vehicle that is set at "0". Thus, the minimum number of estimated-to-be-present vehicles and the maximum number of estimated-to-be-present vehicles can be appropriately reset.

Furthermore, according to this embodiment, the initial value of the number of vehicles that are within a newly found blind closed region can be set, and it can be accurately understood whether there is any vehicle present in the blind closed region. Therefore, for example, when a coordinated control for a vehicle group is to be performed, an efficient vehicle group coordinated control can be executed.

Figure 8:
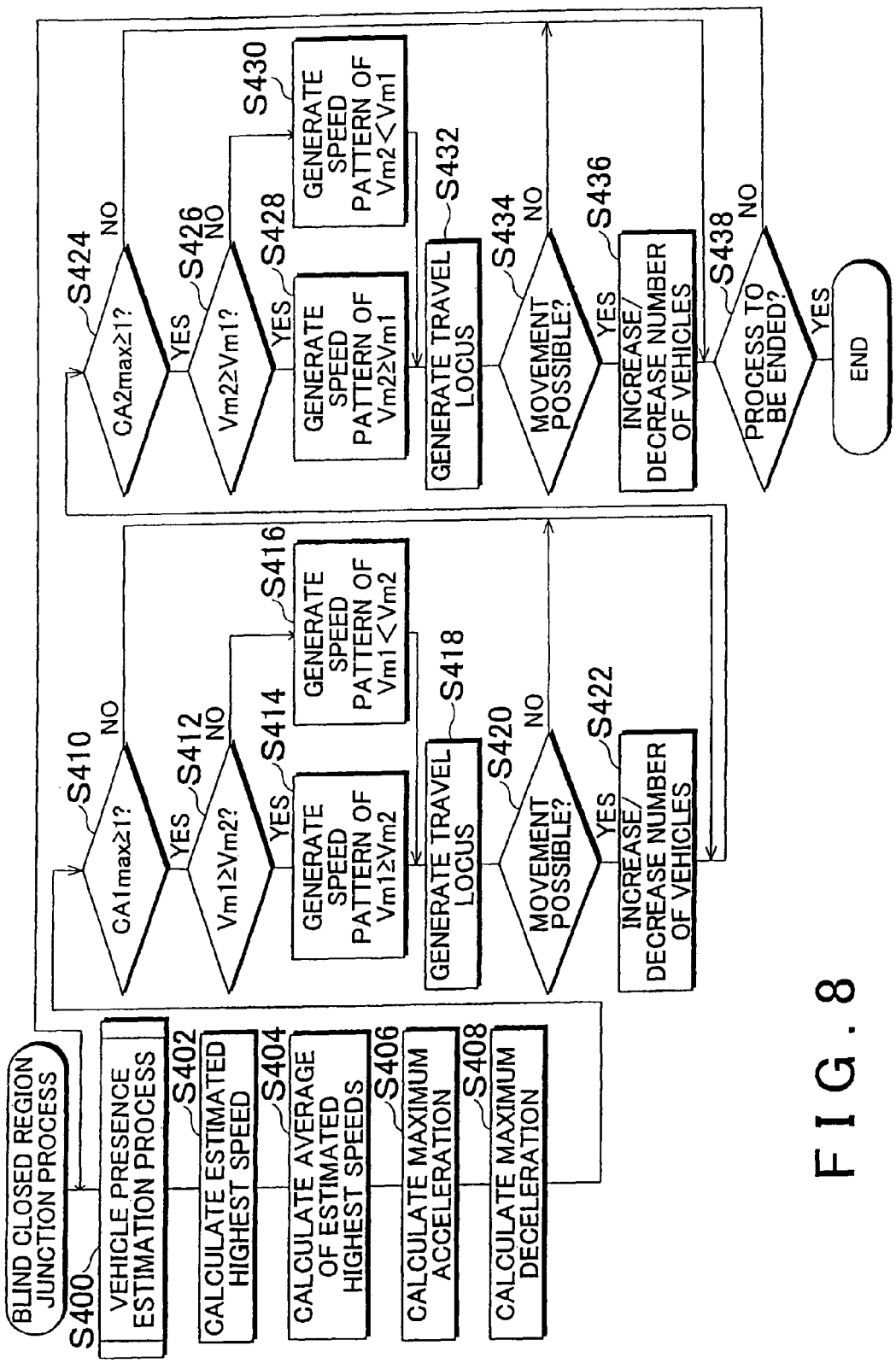
FIG. 8 is a flowchart showing a processing procedure of a blind closed region junction process performed by the vicinity environment estimation device.
Figure 9A:
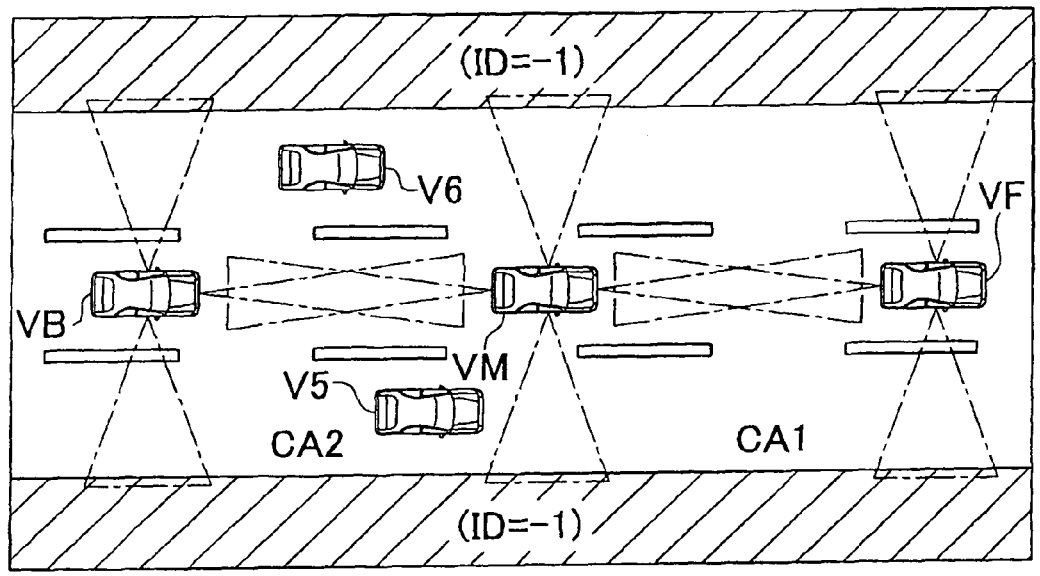
FIGS. 9A and 9B are diagrams for describing the blind closed region junction process performed by the vicinity environment estimation device.
Figure 9B:
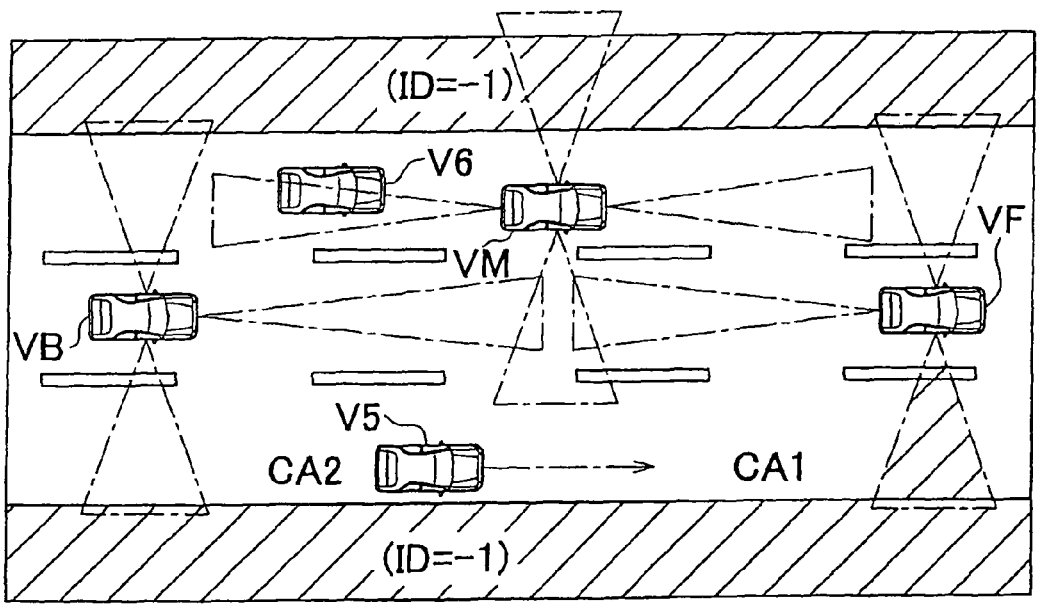

Next, with reference to FIGS. 8, 9A and 9B, a blind closed region junction process performed by a vicinity environment estimation device 1 in accordance with a fourth embodiment of the invention. FIG. 8 is a flowchart showing a processing procedure of the blind closed region junction process performed by the vicinity environment estimation device 1. This process is also executed by the ECU 20 repeatedly at predetermined timing from the turning on of an electric power until the turning off thereof. FIGS. 9A and 9B are diagrams for describing the blind closed region junction process performed by the vicinity environment estimation device 1. FIG. 9A shows a state prior to the junction, and FIG. 9B shows a state at the time of the junction. The description below will be made in conjunction with an example situation as shown in FIGS. 9A and 9B in which a preceding vehicle VF, a host vehicle VM and a succeeding vehicle VB each equipped with neighborhood monitoring sensors 10 and a vehicle-to-vehicle communication instrument 14 are traveling in a longitudinal line, and a first blind closed region CA1 formed rightwardly forward of the host vehicle VM and a second blind closed region CA2 formed rightwardly rearward of the host vehicle VM temporarily join. Herein, the maximum number of estimated-to-be-present vehicles of the first blind closed region CA1 is represented by CA1max, and the minimum number of estimated-to-be-present vehicles thereof is represented by CA1min, and the maximum number of estimated-to-be-present vehicles of the second blind closed region CA2 is represented by CA2max, and the minimum number of estimated-to-be-present vehicles thereof is represented by CA2 min. Besides, in FIG. 9, the component elements that are the same as or comparable to those in FIG. 3 are assigned with the same reference characters.

In step S400, a process formed by excluding steps S122 to S128 from the foregoing vehicle presence estimation process (steps S100 to S142) is executed, so that blind closed regions are continuously managed. The vehicle presence estimation process is as described above, and description thereof is omitted herein.

In step S402, an estimated highest travel speed Vm1 in the first blind closed region CA1 and an estimated highest travel speed Vm2 in the second blind closed region CA2 are found. More specifically, the estimated highest travel speed Vm1 in the first blind closed region CA1 and the estimated highest travel speed Vm2 in the second blind closed region CA2 are calculated from a travel limit speed calculated from a relationship between the legally permitted travel speed and the road alignment information acquired from the car navigation system 11 and the like and an assumed limit lateral acceleration (e.g., 0.2 G) with a variation due to differences among individual drivers (e.g., +20 km/h) factored in.

Subsequently in step S404, an average speed Vave of the estimated highest travel speed Vm1 and the estimated highest travel speed Vm2 is found using the following equation (1).

$$Vave=(Vm1+Vm2)/2 \quad (1)$$

Subsequently in step S406, a common vehicle's maximum acceleration Gam at the speed Vave (e.g., +0.2 G) is acquired. Subsequently in step S408, a common vehicle's maximum deceleration Gdm at the speed Vave (e.g., −0.5 G) is acquired. Incidentally, the maximum acceleration Gam and the maximum deceleration Gdm for the speed Vave are stored beforehand in a database or the like.

Next, in step S410, it is determined whether or not the maximum number of estimated-to-be-present vehicles (CA1max) of the first blind closed region CA1 is greater than or equal to 1. In the case where the maximum number of estimated-to-be-present vehicles (CA1max) is greater than or equal to 1, the process proceeds to step S412. On the other hand, if the maximum number of estimated-to-be-present vehicles (CA1max) is less than 1, that is, it is estimated that no vehicle is present in the first blind closed region CA1, the process proceeds to step S424.

In step S412, it is determined whether or not the estimated highest travel speed Vm1 in the first blind closed region CA1 is greater than or equal to the estimated highest travel speed Vm2 in the second blind closed region CA2. In the case where the estimated highest travel speed Vm1 is greater than or equal to the estimated highest travel speed Vm2, the process proceeds to step S414. On the other hand, if the estimated highest travel speed Vm1 is less than the estimated highest travel speed Vm2, the process proceeds to step S416.

In step S414, a deceleration pattern (speed change pattern) is generated on the assumption that, in a boundary region between the first blind closed region CA1 and the second blind closed region CA2, the vehicle is decelerated from the estimated highest travel speed Vm1 in the first blind closed region CA1 found in step S402 at the maximum deceleration Gdm found in step S408. On the basis of this speed change pattern, the junction of the first blind closed region CA1 and the second blind closed region CA2 is simulated. After that, the process proceeds to step S418.

In step S416, on the other hand, an acceleration pattern (speed change pattern) is generated on the assumption that, in the boundary region between the first blind closed region CA1 and the second blind closed region CA2, the vehicle is accelerated from the estimated highest travel speed Vm1 in the first blind closed region CA1 found in step S402 at the maximum acceleration Gam found in step S408. On the basis of this speed change pattern, the junction of the first blind closed region CA1 and the second blind closed region CA2 is simulated. After that, the process proceeds to step S418.

In step S418, a travel locus of the vehicle is generated on the premise of the speed change pattern generated in step S414 or S416.

Subsequently in step S420, it is determined from the travel locus generated in step S418 whether or not it is possible for the vehicle to move from the first blind closed region CA1 to the second blind closed region CA2 within an elapsed time T (second) following the junction of the first blind closed region CA1 and the second blind closed region CA2. In the case where it is determined that such a movement of the vehicle is possible, the process proceeds to step S422. On the other hand, in the case where it is determined that such a movement is impossible, the process proceeds to step S424.

In step S422, according to the number of vehicles that can move from the first blind closed region CA1 to the second blind closed region CA2, the minimum number of estimated-to-be-present vehicles CA1min of the first blind closed region CA1 and the maximum number of estimated-to-be-present vehicles CA2max of the second blind closed region CA2 are updated. Concretely, if the number of movement-capable vehicles is D, [the minimum number of estimated-to-be-present vehicles CA1min (previous value)−D] is set as a minimum number of estimated-to-be-present vehicles CA1min (present value), and [the maximum number of estimated-to-be-present vehicles CA2max (previous value)+D] is set as a maximum number of estimated-to-be-present vehicles CA2max (present value).

Subsequently in step S424, it is determined whether or not the maximum number of estimated-to-be-present vehicles CA2max of the second blind closed region CA2 is greater than or equal to 1. In the case where the maximum number of estimated-to-be-present vehicles CA2max is greater than or equal to 1, the process proceeds to step S426. On the other hand, if the maximum number of estimated-to-be-present vehicles CA2max is less than 1, that is, if it is estimated that no vehicle is present in the second blind closed region CA2, the process proceeds to step S438.

In step S426, it is determined whether or not the estimated highest travel speed Vm2 in the second blind closed region CA2 is greater than or equal to the estimated highest travel speed Vm1 in the first blind closed region CA1. In the case where the estimated highest travel speed Vm2 is greater than or equal to the estimated highest travel speed Vm1, the process proceeds to step S428. On the other hand, if the estimated highest travel speed Vm2 is less than the estimated highest travel speed Vm1, the process proceeds to step S430.

In step S428, a deceleration pattern (speed change pattern) is generated on the assumption that, in a boundary region between the second blind closed region CA2 and the first blind closed region CA1, the vehicle is decelerated from the estimated highest travel speed Vm2 in the second blind closed region CA2 found in step S402 at the maximum deceleration Gdm found in step S408. On the basis of this speed change pattern, the junction of the second blind closed region CA2 and the first blind closed region CA1 is simulated. After that, the process proceeds to step S432.

In step S430, on the other hand, an acceleration pattern (speed change pattern) is formed on the assumption that, in the boundary region between the second blind closed region CA2 and the first blind closed region CA1, the vehicle is accelerated from the estimated highest travel speed Vm2 in the second blind closed region CA2 found in step S402 at the maximum acceleration Gam found in step S408. On the basis of this speed change pattern, the junction of the second blind closed region CA2 and the first blind closed region CA1 is simulated. After that, the process proceeds to step S432.

In step S432, a travel locus of the vehicle is generated on the premise of the speed change pattern generated in step S428 or S431.

Subsequently in step S434, it is determined from the travel locus generated in step S432 whether or not it is possible for the vehicle to move from the second blind closed region CA2 to the first blind closed region CA1 within an elapsed time T (second) following the junction of the first blind closed region CA1 and the second blind closed region CA2. In the case where it is determined that such a movement of the vehicle is possible, the process proceeds to step S436. On the other hand, in the case where it is determined that such a movement is impossible, the process proceeds to step S438.

In step S436, according to the number of vehicles that can move from the second blind closed region CA2 to the first blind closed region CA1, the minimum number of estimated-to-be-present vehicles CA2min of the second blind closed region CA2 and the maximum number of estimated-to-be-present vehicles CA1max of the first blind closed region CA1 are updated. Concretely, if the number of movement-capable vehicles is D, [the minimum number of estimated-to-be-present vehicles CA2min (previous value)−D] is set as the minimum number of estimated-to-be-present vehicles CA2min (present value), and [the maximum number of estimated-to-be-present vehicles CA1max (previous value)+D] is set as the maximum number of estimated-to-be-present vehicles CA1max (present value).

In step S440, it is determined whether or not to end the process. That is, in the case where a condition for ending this process is satisfied, this process is temporarily exited. On the other hand, if the condition for ending the process is not satisfied, the process proceeds to step S400. Thus, until the ending condition is satisfied, the process of steps step S400 to S436 is repeatedly executed.

In the case where first blind closed region CA1 and the second blind closed region CA2 temporarily join as shown in FIG. 9B, the probability of a vehicle moving between the first blind closed region CA1 and the second blind closed region CA2 through the joined portion changes depending on the duration of the junction and the like. According to this embodiment, since the probability of movement of a vehicle between the first blind closed region and the second blind closed region is estimated on the basis of the duration of the junction and the like, it becomes possible to accurately estimate the numbers of vehicles in the first blind closed region CA1 and in the second blind closed region CA2 after the junction disappears.

It is to be noted herein that the shorter the duration of the junction of the first blind closed region CA1 and the second blind closed region CA2, the lower the probability of a vehicle moving between the first blind closed region CA1 and the second blind closed region CA2 becomes. In this embodiment, since the probability of a vehicle having moved between the first blind closed region CA1 and the second blind closed region CA2 is estimated by taking the duration of the junction into account, the possibility of inter-region movement of a vehicle can be estimated with good accuracy.

Furthermore, according to this embodiment, the numbers of vehicles in the first blind closed region CA1 and in the second blind closed region CA2 after the junction disappears can be estimated with good accuracy. Therefore, for example, when a coordinated control for a vehicle group is to be performed, a more efficient vehicle group coordinated control can be executed.

The invention can also be employed in manners other than the foregoing embodiments. For example, as for the neighborhood monitoring sensors 10 mounted in a vehicle, the number of the sensors, the location of installation, the detection characteristics (detectable regions), etc., are not limited by the foregoing embodiments.

Furthermore, although the foraging embodiments are described in conjunction with example cases where the number of vehicles equipped with a vicinity environment estimation device 1 is two or three, the number of vehicles equipped with a vicinity environment estimation device 1 may also be four or more. Besides, the number of vehicles equipped with a vicinity environment estimation device 1 may also be one.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vicinity environment estimation device that detects obstacles traveling in a vicinity of a host vehicle and notifies a user, the vicinity environment estimation device comprising:
   a plurality of obstacle detection portions that detect an obstacle present in a vicinity of a host vehicle;
   a no-entry region acquisition portion that acquires an untravelable region where it is not possible for a vehicle to travel;
   an estimation portion that, when a closed region surrounded by detectable regions of the plurality of obstacle detection portions and the untravelable region acquired by the no-entry region acquisition portion is formed, estimates presence of an obstacle in the closed region by managing the closed region and a result of detection of the obstacle detection portions in a time-series fashion; and
   a vehicle-to-vehicle communication instrument that receives from another vehicle a result of detection of obstacle detection portions, which detect an obstacle present in a vicinity of the other vehicle, mounted in the other vehicle and detectable regions of the obstacle detection portions mounted in the other vehicle,
   wherein when the vehicle-to-vehicle communication instrument receives the result of detection of the obstacle detection portions mounted in the other vehicle, and a closed region, which is surrounded by the detectable regions of the other vehicle is received by the vehicle-to-vehicle communication instrument, the detectable regions of the host vehicle, and the untravelable region is formed, the estimation device estimates presence of an obstacle in the closed region by managing, in a time-series fashion, the closed region and the result of detection of the obstacle detection portions in the host vehicle and the other vehicle received by the vehicle-to-vehicle communication instrument in a time-series fashion.

2. The vicinity environment estimation device according to claim 1, wherein the estimation portion periodically acquires the result of detection of the obstacle detection portions and a result of acquisition of the no-entry region acquisition portion, and performs management in a time-series fashion by comparing the results of nth acquisition by the estimation portion and the results of (n−1)th acquisition by the estimation portion.

3. The vicinity environment estimation device according to claim 1, wherein the estimation portion estimates presence of the obstacle in the closed region based on a size of the closed region.

4. The vicinity environment estimation device according to claim 1, wherein the estimation portion estimates that no obstacle is present in the closed region when the closed region is formed from a state where the size of the closed region is zero.

5. The vicinity environment estimation device according to claim 1, further comprising a shape information recording portion that has information about a shape of the obstacle, wherein
   the estimation portion estimates the presence of the obstacle in the closed region by comparing a shape of the closed region and the shape of the obstacle from the shape information recording portion.

6. The vicinity environment estimation device according to claim 5, wherein the estimation portion estimates that no obstacle is present in the closed region when the shape of the closed region is smaller than the shape of the obstacle from the shape information recording portion.

7. The vicinity environment estimation device according to claim 1, wherein if a first closed region surrounded by detectable regions of a preceding vehicle which is received by the vehicle-to-vehicle communication instrument, the detectable regions of the host vehicle, the untravelable region, a second closed region surrounded by detectable regions of a succeeding vehicle which is received by the vehicle-to-vehicle communication instrument, the detectable regions of the host vehicle, and the untravelable region temporarily join, the estimation portion estimates presence of an obstacle in each of the first closed region and the second closed region based on a duration of junction of the first closed region and the second closed region.

8. The vicinity environment estimation device according to claim 7, wherein the estimation portion sets probability of an obstacle moving between the first closed region and the second closed region lower if the duration of the junction is shorter.

9. The vicinity environment estimation device according to claim 8, further comprising a speed estimation portion that estimates a moving speed of an obstacle in the closed region, wherein:
   the speed estimation portion estimates a first speed that is the moving speed of an obstacle in the first closed region and a second speed that is the moving speed of an obstacle in the second closed region; and the estimation portion estimates movement of an obstacle between the first closed region and the second closed region by comparing the first speed and the second speed.

10. A vicinity environment detection system comprising the vicinity environment estimation device according to claim 1, that is mounted in each of a plurality of vehicles.

11. A control method for a vicinity environment estimation device that includes an obstacle detection portion that detects an obstacle present in a vicinity of a host vehicle, a no-entry region acquisition portion that acquires an untravelable region where it is impossible for a vehicle to travel, and a vehicle-to-vehicle communication instrument that receives from another vehicle a result of detection of obstacle detection portions, which detect an obstacle present in a vicinity of the other vehicle, mounted in the other vehicle and detectable regions of the obstacle detection portions mounted in the other vehicle, the method comprising:

estimating, using a processor that is configured to estimate, when a closed region surrounded by detectable regions of the plurality of obstacle detection portions and the untravelable region acquired by the no-entry region acquisition portion is formed, presence of an obstacle in the closed region by substantially continuously monitoring, in a time-series fashion, an entry and exit of obstacles into and from the closed region and managing a result of detection of the obstacle detection portions, wherein when the vehicle-to-vehicle communication instrument receives the result of detection of the obstacle detection portions mounted in the other vehicle, and a closed region, which is surrounded by the detectable regions of the other vehicle received by the vehicle-to-vehicle communication instrument, the detectable regions of the host vehicle, and the untravelable region is formed, presence of an obstacle in the closed region is estimated by substantially continuously monitoring, in a time-series fashion, an entry and exit of obstacles into and from the closed region and managing the result of detection of the obstacle detection portions in the host vehicle and the other vehicle received by the vehicle-to-vehicle communication instrument in a time-series fashion.

\* \* \* \* \*